United States Patent

[11] 3,610,947

[72] Inventors Viktor Herbert Stephanides
Zurich;
Richard Thaler, Unterentfelden, both of Switzerland
[21] Appl. No. 54,737
[22] Filed July 14, 1970
[45] Patented Oct. 5, 1971
[73] Assignee Sprecher & Schuh AG
Aargau, Switzerland
[32] Priority July 15, 1969
[33] Switzerland
[31] 10,720/69

[54] ENCAPSULATED GAS-INSULATED HIGH-VOLTAGE LINE
3 Claims, 3 Drawing Figs.

[52] U.S. Cl.................................................. 307/147,
174/16 B, 174/28, 174/99 B, 174/102, 174/115
[51] Int. Cl....................................................... H02b 1/20
[50] Field of Search............................................ 174/28, 29,
16 B, 107, 99 B, 21, 102, 36, 115, 27; 307/11, 12, 13, 147

[56] References Cited
UNITED STATES PATENTS
3,361,870 1/1968 Whitehead.................... 174/99 B
3,391,243 7/1968 Whitehead.................... 174/28
3,046,422 7/1962 Albright......................... 307/147
2,972,005 2/1961 Brealey, Jr. et al............. 174/99 B
2,024,957 12/1935 Van De Graaff............... 307/147

Primary Examiner—E. A. Goldberg
Assistant Examiner—A. T. Grimley
Attorney—Waters, Roditi, Schwartz & Nissen ABSTRACT: An encapsulated gas-insulated high-voltage line for three-phase alternating-current energy transmission which is of the type incorporating a plurality of assembled longitudinal elements for each phase. Each such longitudinal element possesses an internally arranged conductor surrounded by a substantially tubular jacket formed of an insulator and filled with an insulating gas. Further, insulating support means serve to secure the internally arranged conductor within each associated tubular jacket. A ground wire is arranged parallel to the aforesaid longitudinal elements along the entire length of the high-voltage line. The invention further contemplates that at least one lining means formed of electrically conductive material and enclosed by an insulating material is embedded in the entire wall of each tubular jacket, this lining means being galvanically connected at least at one location with the ground wire.

3,610,947

ENCAPSULATED GAS-INSULATED HIGH-VOLTAGE LINE

BACKGROUND OF THE INVENTION

The present invention relates to a new and improved construction of encapsulated gas-insulated high-voltage transmission line for three-phase alternating-current energy transmission which is of the type comprising a plurality of assembled longitudinal elements for each phase, each such longitudinal element being equipped with an internally arranged conductor surrounded by a tubular jacket formed of an insulating material and filled with an insulating gas, the aforesaid internal conductor being secured by insulating support means within its associated tubular jacket.

Most cases the transmission of electrical energy beneath the ground is undertaken with the aid of cables. Economic calculations have proved that for high voltages and high currents the use of a metal encapsulated gas-insulated high-voltage line is an advantageous solution in lieu of parallelly connected cables.

The overvoltages occurring during rapid matching operations at the encapsulation of a metal-encapsulated high-voltage line can be prevented by grounding at both ends the continuous metallic encapsulation. In such metal encapsulations which are grounded at both ends of a three-phase energy transmission system consisting of three adjacently arranged single-phase lines or conductors, the operating current induces voltages which produce a current in the metal encapsulation. The losses caused by this additional current in the metal encapsulation reduces the load-carrying capability of the high-voltage line.

If the encapsulation is formed of an insulating material, then, no such type currents can be induced. However, capsulations of this type construction are unsuitable because the dimensions become considerably larger than those prevailing for a metallic encapsulation when there is absent a clear limiting of the electrical field.

Encapsulations formed of an insulating material have become known to the art which are of the type externally provided with a continuous grounded metallic layer. Yet, even here it is possible for undesired currents induced by the operating current to appear in the metallic layer of such encapsulations which, in turn, again reduce the load-carrying capability of the high-voltage line.

SUMMARY OF THE INVENTION

Thus, a real need exists in the art for an encapsulated high-voltage line which is not associated with the aforementioned drawbacks of the prior art constructions. Hence, a primary objective of the present invention is to provide just such type of encapsulated gas-insulated high-voltage line which effectively and reliably fulfills this need.

Another, more specific object of the present invention is to provide an improved construction of such encapsulated, gas-insulated, economically advantageous high-voltage line for a three-phase energy transmission system which prevents the occurrence of overvoltages during rapid balancing or matching operations which otherwise would endanger the insulation and the surroundings, and further, wherein there is effectively prevented the occurrence of induced currents at the encapsulation during the operating frequency which would reduce the load-carrying capability of the high-voltage line.

Now, in order to implement these and still further objects of the invention, which will become more readily apparent as the description proceeds, the inventive encapsulated, gas-insulated high-voltage line is generally manifested by the features that a ground conductor or wire is arranged parallel to the longitudinal elements along the entire length of the high-voltage line, and in the entire wall of each tubular jacket there is embedded at least one lining enclosed by insulating material and formed of electrically conductive material, this lining being galvanically connected at least at one location with the ground conductor or wire.

A particularly advantageous embodiment of the invention is provided if the lining embedded in the entire wall of each tubular jacket consists of two oppositely wound metallic bands electrically insulated between the windings and layers. These metal bands possess a high chemical resistance in relation to the parallelly guided ground wire, with both such metallic bands being galvanically connected at both ends of each tubular jacket with the ground wire.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

!DETAILED DESCRIPTION OF THE PREFERRED EMBODIMENT

Figures 1, 2:
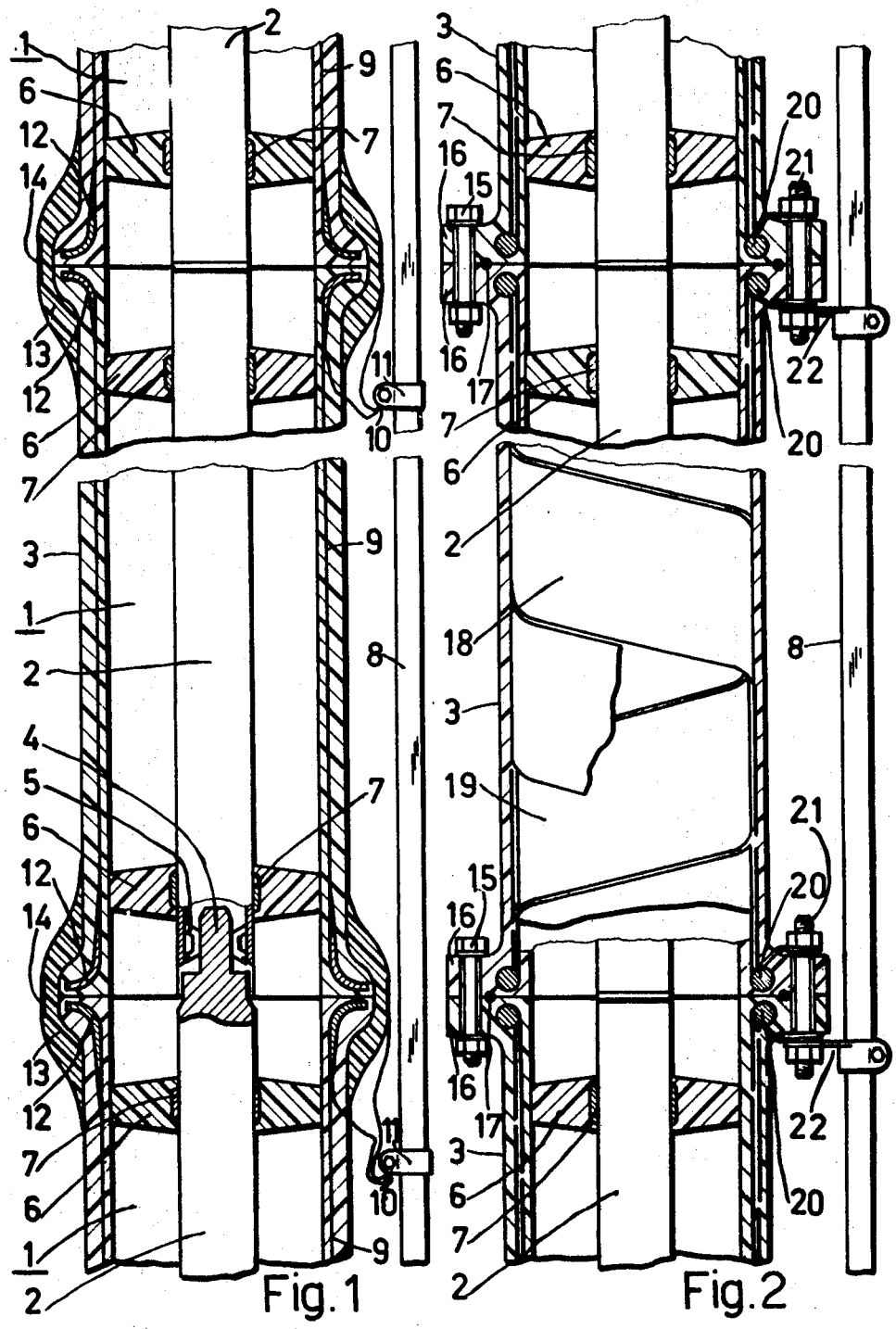
FIG. 1 is a fragmentary longitudinal sectional view of one phase of an encapsulated, gas-insulated high-voltage line.
FIG. 2 is a fragmentary longitudinal sectional view of one phase of an encapsulated high-voltage line possessing oppositely wound high-ohm metalic band members serving as the lining means.

Describing now the drawings, the one phase of the exemplary embodiment of inventive high-voltage line depicted in FIG. 1 is assembled from a plurality of longitudinal elements 1. Each longitudinal element 1 is centrally provided with an internal cylindrical conductor 2 serving for the conduction of current. Conductor 2 is surrounded by a tubular jacket or sheath 3 consisting of a suitable insulating material. The hollow compartments within the tubular jacket 3 are filled with a suitable insulating gas, for instance $SF_6$. Furthermore, the internal conductors 2 of the individual longitudinal elements 1 are electrically conductively coupled with one another via the plugs 4 and contacts 5. The connection location of the internal conductor 2 simultaneously serves as an expansion element and takes up the differences in lengthwise expansion between the conductor 2 and the tubular jacket 3.

Continuing, it should be understood that the internal conductor 2 is secured within the tubular jacket 3 by means of substantially disc-shaped insulating supports 6. These insulating supports 6 are formed of a suitable moldable plastic or synthetic resin, possessing an internal metallic electrode 7 for purposes of controlling the electrical field. Insulating support means 6 are adhesively bonded, or otherwise suitably affixed, within the tubular jacket 3. The adhesive bond prevents the marginal edges of the disc-shaped insulating supports 6 from glowing, by filling out the gap between the insulating support means 6 and the associated tubular jacket 3. Now, according to the invention a common ground conductor or wire 8 for all of three phases is arranged parallel and adjacent to the tubular jacket 3, as shown.

Furthermore, the invention contemplates the embedding of linings 9 formed of electrically conductive material in the walls of each of the tubular jacket 3. These linings 9 are encased by the insulating material from which the relevant tubular jacket 3 is formed, and further, such linings 9 are galvanically connected at a location 10 with the ground wire 8 through the agency of clamps 11, or equivalent fastening expedients. Linings 9 can be, for instance, formed of a brass netting or from a wound copper band and soldered at both ends with the termination electrodes 12. These termination electrodes 12 ensure that the electrical field intensity at the ends of the linings 9 remains below the permissible boundary values.

Since the linings 9 of conductor individual longitudinal elements 1 are insulated from one another and with respect to ground and are only galvanically coupled at one location 10 with the ground wire or conductor 8, it is impossible for any undesirable current to flow therein during the operational frequency. During rapid balancing operations it is possible for a certain voltage difference to exist between the neighboring termination electrodes 12, which, however, is maintained by the insulation.

After the longitudinal elements 1 are inserted or otherwise assembled together the tubular jacket 3 are externally wound at the connection locations with a band member 13 formed of a resin-imbued spun glass fabric, a ground lining or covering 14 further being applied to the surface of this band member 13, as shown. The entire band member 13 is thereafter enclosed by a two-part mold and molded with a liquid plastic or resin. Upon hardening of the plastic the mold is removed. There is thus provided a gastight closure of the impact locations between two neighboring tubular jackets or sheaths 3.

FIG. 2 illustrates a modification of the invention and depicts a phase of a further embodiment of high-voltage line equipped with the internal conductors 2, the tubular jackets or sheaths 3 and the insulating supports 6. In this instance, the connection of the tubular jackets 3 with one another is undertaken through the agency of screws 15 serving to clamp together the cast flanges 16 with the sealing means 17. The screws 15 are grounded by an electrical connection.

In this arrangement the lining means within each tubular jacket 3 consists of two oppositely wound metallic bands 18 and 19 which are insulated between the windings and layers. These metallic bands 18 and 19 possess a high ohmic resistance in relation to the parallelly arranged ground wire 8. Metallic bands 18 and 19 are engaged at both ends in the substantially ring-shaped termination electrodes 20, thus are connected parallel to one another. The ring-shaped termination electrodes 20 of two assembled tubular jackets 3 are electrically coupled with one another by means of screws 21. Hence, all of the linings of one phase are thus connected in series. The metallic bands 18 and 19 are galvanically coupled at each connection location 22 with the ground wire 8.

The inductance of the arrangement of FIG. 2 is the same as that of a solid tube for uniform current distribution. The same current magnitudes appear in both parallel connection oppositely wound metallic bands 18, 19. This is ensured for with slowly varying currents by the same resistance values of both metallic bands 18 and 19, and for rapid current fluctuations there is brought about a uniform current distribution by virtue of the inductances. If a displacement current flows from the conductor 2 to the inner metallic band 19, then such likewise is distributed to both metallic bands 18 and 19, since the coupling capacitances between the layers are greater by a factor of $10^3 ... 10^5$ than the capacitance between the conductor 2 and the inner metallic band 19. Hence, the voltage drops caused by the displacement current in the layer insulations remains very small.

An especially favorable solution is realized if the metallic bands 18 and 19 are formed of an eloxadized aluminum foil. In such case, the eloxadized layer serves as the insulation between the windings and layers. An extremely thin eloxadized layer of 1–4 microns thus possesses a sufficient insulation capacity and can retain all occurring voltages. On the one hand, with such insulation there is provided an extremely high coupling capacitance between the layers. On the other hand, prior to the occurrence of breakdown pronounced leakage currents can flow through the eloxadized layer over a wide range. These leakage currents can assume values greater than 10 A./m.$^2$ without destructing the insulation capacity. The voltage differences occurring between the layers are balanced by these leakage currents. Therefore, when using such type eloxadized aluminum bands both layers can be directly wound over one another.

The tubular jackets 3 can also be fabricated in radial direction from two different insulating materials. An advantageous embodiment of the invention can be realized if the inner layer of the tubular jacket is formed from a thermoplastic material and the linings are placed upon such layer. On the outside there is then applied a layer possessing the flanges and consisting of a glass-fiber-reinforced plastic. This solution is advantageous both for reasons of economy and technology. The inner thermoplastic layer constitutes the sealing and gastight layer. Thermoplastics such as for example rigid-PVC or polypropylene have proven themselves to be particularly suitable when using $SF_6$, because they are resistant with respect to the decomposition products of the $SF_6$ insulation gas. The linings undertake the electrostatic screening. The outer layer consisting of glass-fiber-reinforced plastic strengthens the tubular jacket 3 and takes up the mechanical forces which occur.

Figure 3:
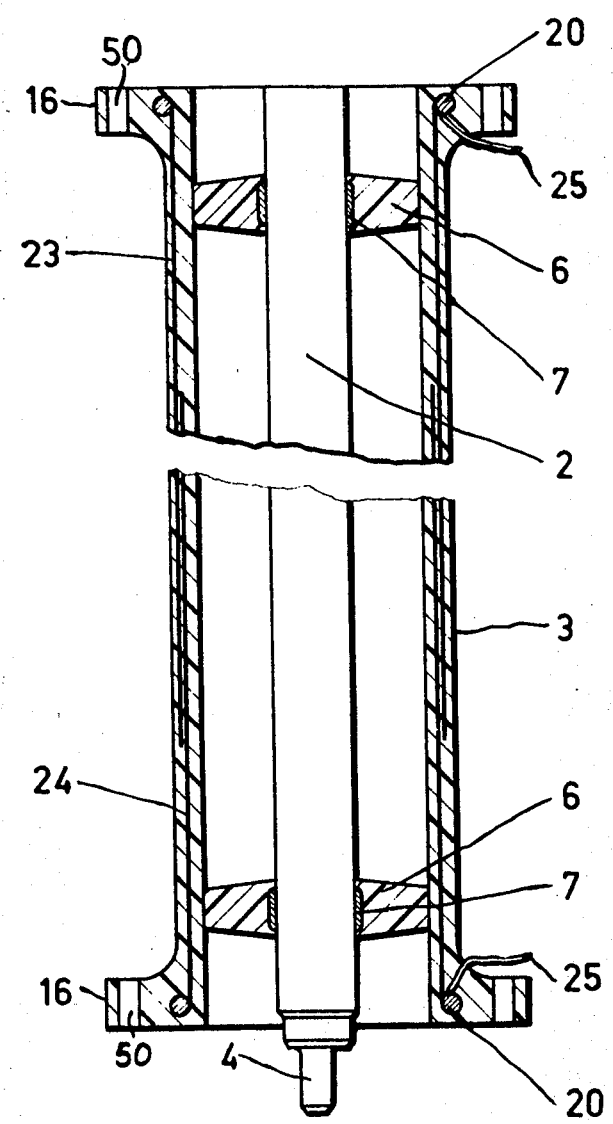
FIG. 3 is a fragmentary longitudinal sectional view of a longitudinal element possessing two overlapping linings.

FIG. 3 illustrates a further embodiment of longitudinal element. Here, the internal conductor 2 carrying the plug 4 is attached within the tubular jacket 3 by means of the insulation supports 6 equipped with an internal metallic electrode 7. As evidenced by referring to FIG. 3, the tubular jacket 3 is, in this case, provided with suitable openings or apertures 50 at the flange means 16 in order to receive screw members or the like to provide a threaded connection between the individual longitudinal elements.

Continuing, it will be observed that at the wall of each tubular jacket 3 there are embedded two linings 23 and 24 which partially overlap, yet are insulated from one another. These linings 23 and 24 are electrically coupled at the sides of the flanges 16 of each longitudinal or lengthwise element with the termination electrodes 20 carrying the ground connection 25. Linings 23 and 24 can be fabricated from brass netting or from wound bare copper bands.

With operating frequency currents only a small displacement current flows in the tubular jackets 3 due to the galvanic interruption location of the lining. The load-carrying capacity of the high-voltage line is only slightly reduced by this current. On the other hand, during rapid balancing operations pronounced currents flow between the overlapping linings 23 and 24 because of the capacitance. These currents can reduce the voltage between both linings 23 and 24. By selecting the length of the overlapping of the linings 23 and 24 it is possible to select the capacitance such that the voltage difference between the linings 23 and 24, in all instances, remains so small that no damage to the insulation can occur.

While there are shown and described present preferred embodiments of the invention, it is to be distinctly understood that the invention is not limited thereto, but may be otherwise variously embodied and practiced within the scope of the following claims.

What is claimed is:

1. An encapsulated gas-insulated high-voltage line for three-phase alternating-current energy transmission, comprising a plurality of assembled longitudinal elements for each phase, each longitudinal element possessing an internally arranged conductor surrounded by a tubular jacket formed of an insulating material and filled with an insulating gas, insulating support means for securing said internally arranged conductor within said tubular jacket, a ground wire arranged parallel to said longitudinal elements along the entire length of the high-voltage line, at least one lining means enclosed by insulating material and formed of electrically conductive material embedded in the entire wall of each tubular jacket, and means for galvanically connecting said lining means at least at one location with said ground wire.

2. An encapsulated gas-insulated high-voltage line as defined in claim 1, wherein said lining means embedded in the entire wall of each tubular jacket comprises two oppositely wound metallic band members which are electrically insulated between the windings and layers thereof, said metallic band members possessing a high ohmic resistance in relation to the parallelly arranged ground wire, said galvanically connecting means serving to galvanically connect both metallic band members at both ends of each tubular jacket with said ground wire.

3. An encapsulated gas-insulated high-voltage line as defined in claim 1, wherein said lining means embedded in the entire wall of each tubular jacket comprises two lining members formed of electrically conductive material which are enclosed by insulating material and at least partially overlap one another, both lining members being galvanically connected at one location with said ground wire.